( 12 ) United States Patent
Combes et al.

(10) Patent No.: US 11,247,781 B2
(45) Date of Patent: Feb. 15, 2022

(54) AIRCRAFT TURBINE ENGINE ASSEMBLY COMPRISING A HINGED COVER

(71) Applicant: Airbus Operations SAS, Toulouse (FR)

(72) Inventors: Stéphane Combes, Buzet sur Tarn (FR); Jean Geliot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 405 days.

(21) Appl. No.: 16/513,990

(22) Filed: Jul. 17, 2019

(65) Prior Publication Data

US 2020/0072128 A1 Mar. 5, 2020

(30) Foreign Application Priority Data

Sep. 4, 2018 (FR) ........................ 1857927

(51) Int. Cl.
*B64D 29/08* (2006.01)
*B64D 29/06* (2006.01)
*B64D 27/10* (2006.01)
*F02C 7/20* (2006.01)

(52) U.S. Cl.
CPC ............. *B64D 29/08* (2013.01); *B64D 29/06* (2013.01); *B64D 27/10* (2013.01); *F02C 7/20* (2013.01); *F05D 2220/323* (2013.01); *F05D 2240/90* (2013.01)

(58) Field of Classification Search
CPC ........ B64D 29/08; B64D 29/06; B64D 27/10; B64D 29/02; B64D 27/26; B64D 2027/262; B64D 29/00–08; F02C 7/20; F05D 2220/323; F05D 2240/90; F05D 2230/72;

(Continued)

(56) References Cited

U.S. PATENT DOCUMENTS 4,920,744 A * 5/1990 Garcia ................... B64D 29/08
244/54
5,826,823 A 10/1998 Lymons et al.
(Continued)

FOREIGN PATENT DOCUMENTS

WO 2008006826 A1 1/2008

OTHER PUBLICATIONS

French Search Report; priority document.

*Primary Examiner* — Gerald L Sung
*Assistant Examiner* — Rene D Ford
(74) *Attorney, Agent, or Firm* — Greer, Burns & Crain, Ltd.

(57) ABSTRACT

An aircraft turbine engine assembly including a nacelle structure with a strut attachment zone, a first cover forming an air intake lip, a hinged cover arranged on the nacelle upper portion, between the first cover and the attachment zone, a hinge system of the cover comprising, on either side of a mid-plane of the nacelle, a front rod and a rear rod that are one in front of the other. The two ends of each rod are co-planar, parallel to the mid-plane. A first end of each rod is hinged on the cover. A second end of each rod is hinged on the structure. A locking system is actuatable from the outside of the nacelle between a locked and an unlocked positon. The nacelle comprises at least one cylinder with a first end mounted hinged on the structure and the other end mounted hinged on the cover.

5 Claims, 2 Drawing Sheets

(58) Field of Classification Search
CPC ... B64C 1/1446; B64C 7/02; E05C 9/04–048; E05D 3/14
See application file for complete search history.

(56) References Cited

U.S. PATENT DOCUMENTS

| | | | | |
|---|---|---|---|---|
| 7,275,717 B2* | 10/2007 | Landry | ...................... | B64C 1/22 244/129.5 |
| 8,070,101 B2* | 12/2011 | Vauchel | ................. | B64D 29/06 244/129.4 |
| 8,220,738 B2* | 7/2012 | Calder | ................... | B64D 29/06 244/53 R |
| 8,657,233 B2* | 2/2014 | Meseguer Mata | ..... | B64D 41/00 244/119 |
| 9,188,026 B2* | 11/2015 | Calder | ................... | B64D 29/06 |
| 2004/0000615 A1* | 1/2004 | Gonidec | ................. | B64D 29/00 244/53 B |
| 2006/0237582 A1* | 10/2006 | Layland | ................... | F02C 7/047 244/53 R |
| 2007/0267539 A1* | 11/2007 | Bulin | ...................... | B64D 29/06 244/53 R |
| 2008/0315034 A1* | 12/2008 | Vauchel | ................. | B64D 29/08 244/54 |
| 2009/0283631 A1 | 11/2009 | Roche | | |
| 2010/0176250 A1* | 7/2010 | Porte | ...................... | B64D 27/18 244/53 B |
| 2011/0014044 A1* | 1/2011 | Vauchel | ................. | B64D 29/06 415/214.1 |
| 2011/0174930 A1* | 7/2011 | Porte | ...................... | B64D 29/08 244/131 |
| 2012/0097260 A1* | 4/2012 | Porte | ...................... | B64D 29/06 137/15.1 |
| 2012/0097261 A1* | 4/2012 | Porte | ...................... | B64D 29/08 137/15.1 |
| 2013/0161446 A1* | 6/2013 | Letay | ........................ | F02C 7/20 244/54 |
| 2015/0110613 A1 | 4/2015 | Aten | | |
| 2016/0053719 A1* | 2/2016 | Pretty | ................... | B64D 29/08 239/265.19 |
| 2016/0264249 A1* | 9/2016 | Lozano | ................. | B64D 29/08 |
| 2016/0280383 A1* | 9/2016 | Lee | ...................... | B64D 29/06 |
| 2016/0281539 A1* | 9/2016 | Linde | .................... | B64D 29/06 |
| 2018/0362175 A1* | 12/2018 | Scannell | ............... | B64D 29/06 |
| 2019/0291882 A1* | 9/2019 | Theron | ................. | B64D 29/06 |
| 2020/0189725 A1* | 6/2020 | Jasklowski | ............... | B64C 9/36 |
| 2020/0377220 A1* | 12/2020 | Hellegouarch | ........ | B64D 29/08 |

* cited by examiner

AIRCRAFT TURBINE ENGINE ASSEMBLY COMPRISING A HINGED COVER

CROSS-REFERENCES TO RELATED APPLICATIONS

This application claims the benefit of the French patent application No. 1857927 filed on Sep. 4, 2018, the entire disclosures of which are incorporated herein by way of reference.

FIELD OF THE INVENTION

The present invention relates to a turbine engine assembly of an aircraft comprising a hinged cover, and to an aircraft comprising such an assembly.

BACKGROUND OF THE INVENTION

An aircraft conventionally comprises a fuselage on either side of which is fastened a wing. Each wing supports at least one attachment strut that in turn supports a turbine engine assembly made up of a nacelle and an engine. The nacelle forms the aerodynamic surface that surrounds the engine.

The attachment strut is fastened to the wing structure and the turbine engine assembly.

A number of systems, for example electric and hydraulic, are arranged at the joint between the attachment strut and the turbine engine assembly. These systems are concealed by aerodynamic covers, such as, for example, some of those forming the nacelle.

In particular, to reach some systems such as the electrical connections between the attachment strut and the engine, several covers situated on the upper portion of the nacelle must be removed.

Currently, these covers are fastened by several fastening screws, and during maintenance steps, it takes a long time to remove and replace each cover.

SUMMARY OF THE INVENTION

An object of the present invention is to propose a nacelle that comprises a hinged cover that has an extended surface and is hinged so as to facilitate access to the systems located at the joint between the attachment strut and the engine.

To this end, an aircraft turbine engine assembly is proposed including a nacelle, the nacelle comprising:
  a structure comprising an attachment zone configured to be fastened to an attachment strut of the aircraft,
  an air intake defined by a first cover forming an air intake lip and fastened to the structure,
  a hinged cover arranged on the upper portion of the nacelle, at the rear of the first cover and between the first cover and the attachment zone,
  a hinge system ensuring the movement of the hinged cover alternately between a closed position in which the hinged cover is aerodynamically continuous with the other covers and an open position in which the hinged cover clears an opening in the nacelle, and comprising on either side of a mid-plane XZ of the nacelle, a front rod and a rear rod that are one in front of the other, where the two ends of each rod are in the same plane parallel to the mid-plane XZ, where a first end of each rod is mounted hinged on the hinged cover, where a second end of each rod is mounted hinged on the structure,
  a locking system that can be actuated from the outside of the nacelle between a locked position in which the locking system locks the hinged cover onto the structure and an unlocked position in which the locking system does not lock the hinged cover onto the structure, and
  at least one cylinder one end of which is mounted hinged on the structure and the other end of which is mounted hinged on the hinged cover and that is arranged to assist the opening of the hinged cover and to ensure that the hinged cover is held in the open position.

Such a nacelle therefore facilitates the technicians' work, as a single hinged cover makes it possible to replace several covers and it can be opened and closed easily and quickly.

Advantageously, the locking system comprises several catches distributed around the hinged cover.

Advantageously, each catch comprises a case fastened to the hinged cover and containing a bolt, and an edge plate fastened to the structure and containing a keeper, where the bolt is translatably mobile in the case between a locked position in which it is locked in the keeper and an unlocked position in which it is not locked in the keeper.

Advantageously, the turbine engine assembly comprises several studs fastened under the hinged cover and, for each stud, a window rigidly connected to the structure, where in the closed position, each stud is positioned in a window.

Advantageously, the turbine engine assembly comprises at least one cylinder, one end of which is mounted hinged on the structure and the other end of which is mounted hinged on the hinged cover.

The invention also proposes an aircraft comprising an attachment strut and a turbine engine assembly according to one of the previous variants, attached to the attachment strut in the attachment zone.

BRIEF DESCRIPTION OF THE DRAWINGS

The features of the invention mentioned above, together with other features, will become more clearly apparent on reading the following description of an embodiment, the description being given with reference to the attached drawings, in which.

DETAILED DESCRIPTION OF THE PREFERRED EMBODIMENTS

Figure 1:
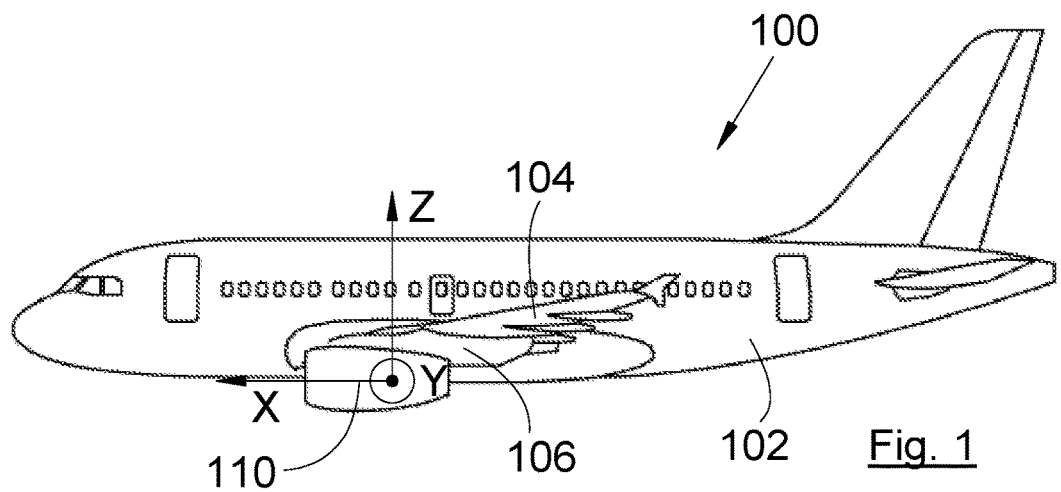
FIG. 1 is a side view of an aircraft according to the invention.

FIG. 1 shows an aircraft 100 that comprises a fuselage 102, on either side of which is fastened a wing 104. Under each wing 104 is fastened an attachment strut 106 to which is attached a turbine engine assembly 108 made up of a nacelle 110 and an engine (not shown) surrounded by the nacelle 110.

In the description below, and by convention, X denotes the longitudinal axis of the nacelle 110 oriented positively in the direction of travel of the aircraft 100 and which is also parallel to the longitudinal axis of the aircraft 100, Y denotes the transverse axis of the nacelle 110, which is horizontal when the aircraft 100 is on the ground, and Z denotes the vertical axis or vertical height when the aircraft 100 is on the ground, these three directions X, Y and Z being orthogonal to each other and forming an orthonormal frame of reference.

The plane XZ forms a mid-plane of the nacelle 110.

Figure 2:
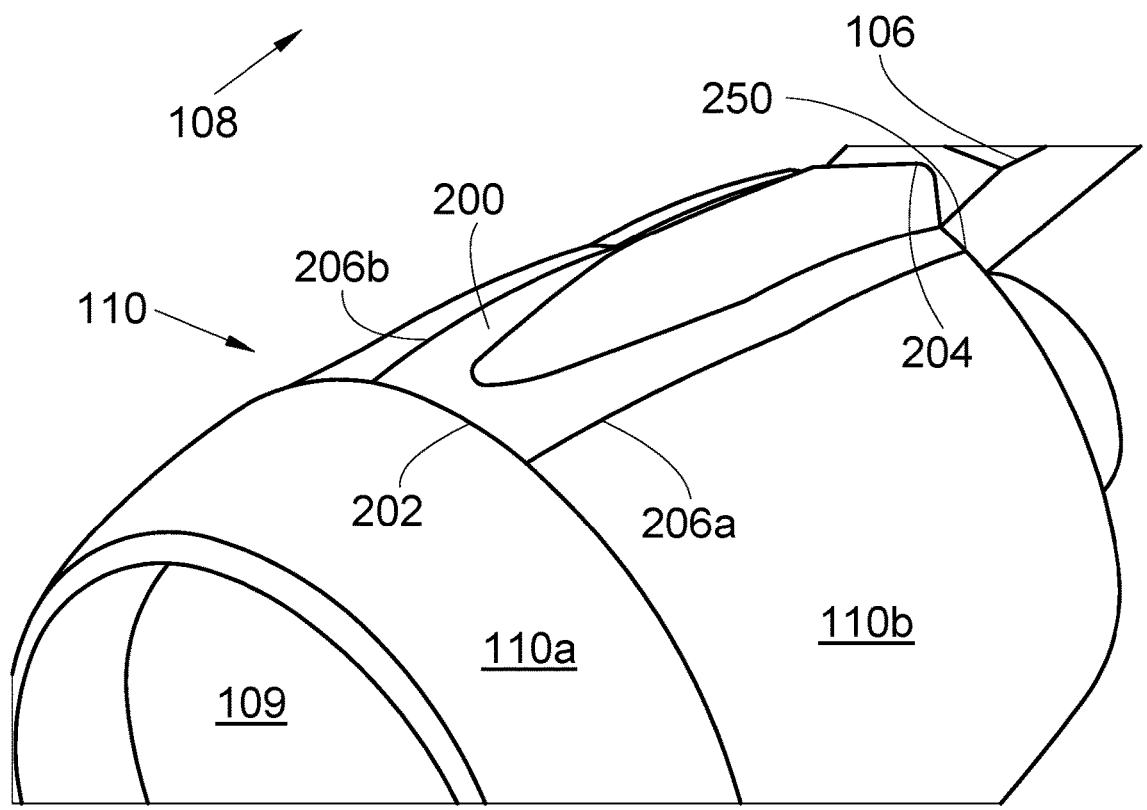
FIG. 2 is a perspective view of a turbine engine assembly according to the invention.
Figure 2:
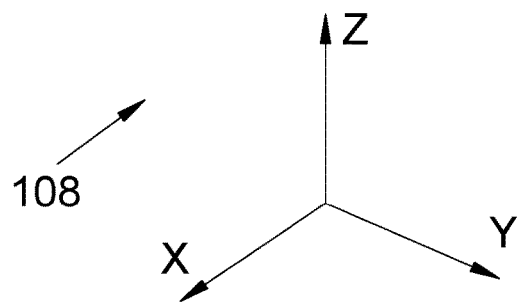

FIG. 2 shows the joint between the turbine engine assembly 108 and the attachment strut 106. The nacelle 110 comprises a structure (402, FIG. 4) and several covers (or fairings) 110*a-b*, 200 that are fastened to the structure 402 in order to produce an aerodynamic surface.

The turbine engine assembly 108 comprises an attachment zone 250 in which the attachment strut 106 is fastened to the structure 402.

In a known manner, the nacelle 110 includes an air intake 109 through which the engine draws the air necessary for the operation thereof and that is defined by a first cover 110*a* forming an air intake lip.

The nacelle 110 also comprises behind the first cover 110*a*, second covers 110*b* taking the form of an arc of cylinder and forming the side walls of the nacelle 110.

The nacelle 110 comprises on the upper portion of the nacelle 110, at the rear of the first cover 110*a* and between the first cover 110*a* and the zone 250 for attachment to the attachment strut 106, a hinged cover 200 according to the invention. The hinged cover 200 defined in this way replaces the plurality of covers fastened with screws that exists in the prior art. The use of a single hinged and extended cover improves, inter alia, the aerodynamics by reducing the number of fastenings and boundaries between the covers.

The hinged cover 200 is also arranged between the second covers 110*b*.

The hinged cover 200 comprises four edges 202, 204 and 206*a-b* facing in pairs.

The hinged cover 200 more particularly has a front edge 202 that is arranged at the front of the hinged cover 200 relative to the longitudinal axis X and that is generally parallel to the transverse axis Y. The front edge 202 extends against the first cover 110*a*.

The hinged cover 200 more particularly has a rear edge 204 that is arranged at the rear of the hinged cover 200 relative to the longitudinal axis X and that is also generally parallel to the transverse axis Y. The rear edge 204 extends in the zone 250 for attachment to the attachment strut 106.

The hinged cover 200 also has two side edges 206*a-b* that are arranged on the port and starboard of the hinged cover 200 and that are generally parallel to the longitudinal axis X. Each side edge 206*a-b* extends against a second cover 110*b*.

Figure 3:
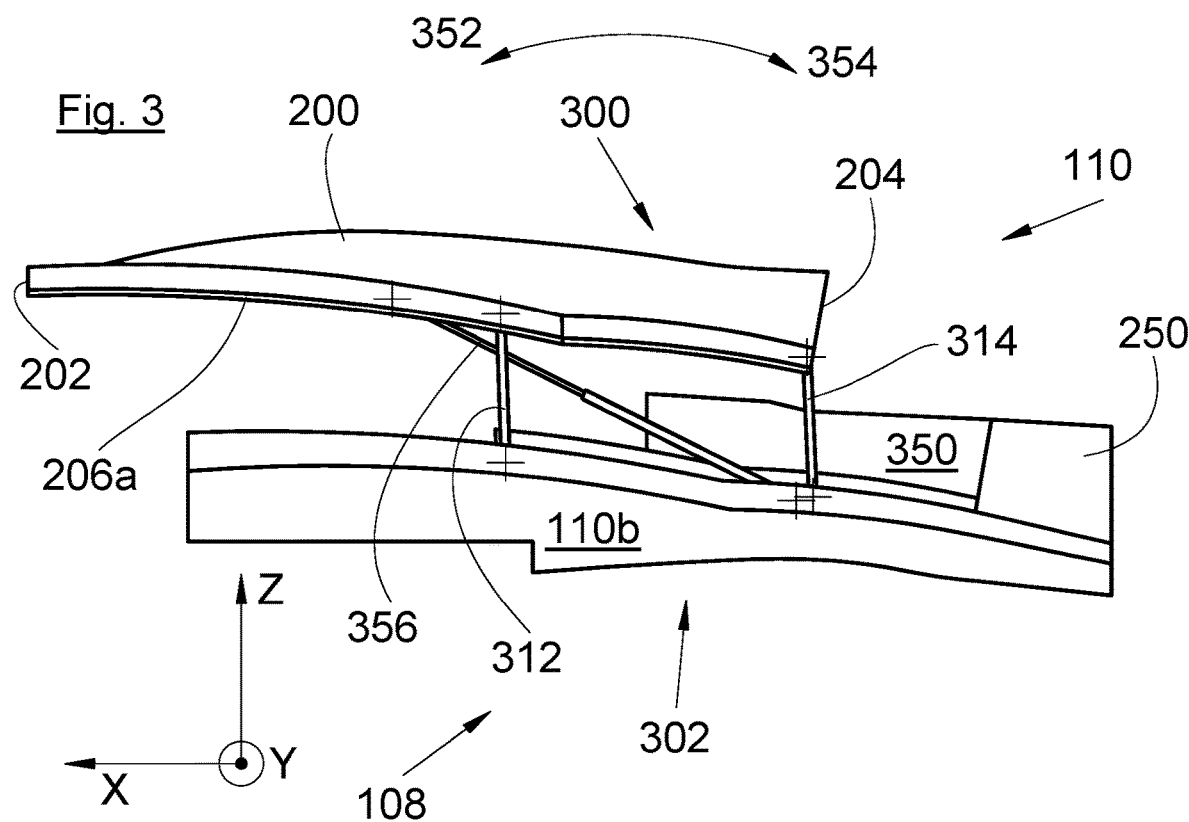
FIG. 3 is a side view of the turbine engine assembly in FIG. 2.

The hinged cover 200 is mounted hinged on the structure 402 of the nacelle 110 between a closed position and an open position. FIG. 2 shows the hinged cover 200 in the closed position in which the hinged cover 200 is aerodynamically continuous with the other covers 110*a-b* of the nacelle 110 and FIG. 3 shows the open position in which the hinged cover 200 clears an opening in the nacelle 110 in order to access the inside of the nacelle 110 and, in particular, the systems of the aircraft 100 that extend between the attachment strut 106 and the engine.

The nacelle 110 comprises a hinge system 300 that is arranged along the two side edges 206*a-b* and a locking system that can be actuated from the outside of the nacelle 110 by a technician between a locked position in which the locking system locks the hinged cover 200 onto the structure 402, thus blocking any movement of the hinged cover 200, and an unlocked position in which the locking system does not lock the hinged cover 200 onto the structure 402, thus permitting the free movement of the hinged cover 200.

The hinge system 300 is fastened between the hinged cover 200 and the structure 402 of the nacelle 110 and ensures the movement of the hinged cover 200 between the closed position and the open position and vice versa.

The hinge system 300 comprises, on either side of the mid-plane XZ of the nacelle 110, a front rod 312 and a rear rod 314 that are one in front of the other relative to the longitudinal axis X.

The two ends of each rod 312, 314 are in the same plane parallel to the mid-plane XZ.

The two ends of each rod 312, 314 are mounted rotatably mobile about an axis of rotation perpendicular to the mid-plane XZ and here parallel to the transverse axis Y. A first end of each rod 312, 314 is mounted hinged on the hinged cover 200 and a second end of each rod 312, 314 is mounted hinged on the structure 402 of the nacelle 110.

The two front 312 and rear 314 rods that are arranged on the same side form with the hinged cover 200 and the structure 402 of the nacelle 110 a deformable quadrilateral 302. In FIG. 3, only the deformable quadrilateral 302 on the port side can be seen and the deformable quadrilateral on the starboard side is identical.

Such a hinge system 300 enables a large opening of the hinged cover 200 and makes access to the systems 350 of the aircraft 100 that are at the joint between the attachment strut 106 and the engine easy and quick.

In FIG. 3, the arrow 352 oriented towards the front shows the direction of movement of the hinged cover 200 to reach the open position and the arrow 354 oriented towards the rear shows the direction of movement of the hinged cover 200 to reach the closed position.

The locking system comprises, for example, several catches 400 distributed around the hinged cover 200 in order to ensure the satisfactory holding of the hinged cover 200 in the closed position.

Figure 4:
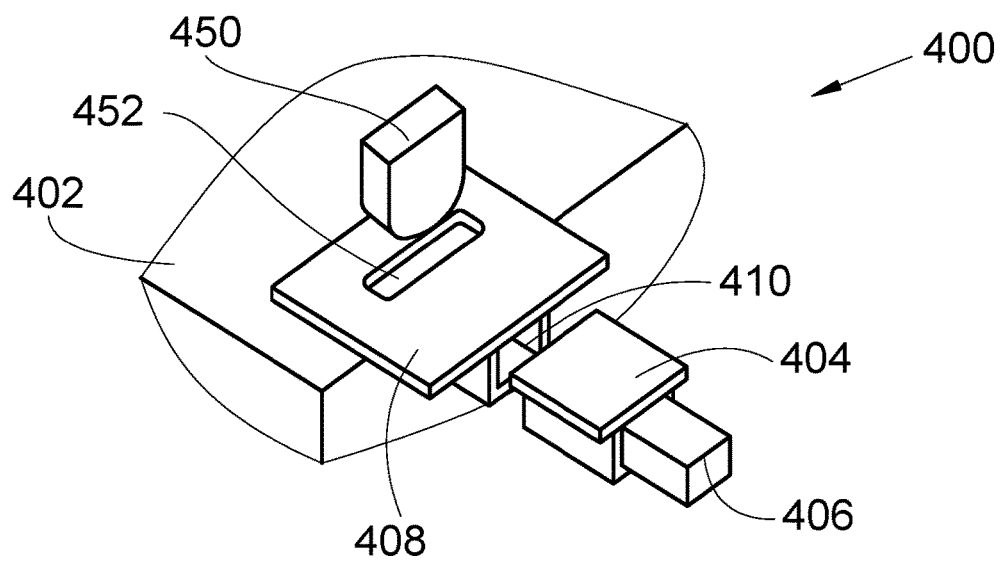
FIG. 4 is a perspective view of an example of a locking catch of the turbine engine assembly.

FIG. 4 shows an example of a catch 400 and there is, for example, a catch 400 at each corner of the hinged cover 200.

The catch 400 comprises a case 404 that is fastened to the hinged cover 200 and contains a bolt 406, and an edge plate 408 that is fastened to the structure 402 and contains a keeper 410. The bolt 406 is translatably mobile in the case 404 between a locked position in which it is locked in the keeper 410 and an unlocked positon in which it is not locked in the keeper 410.

In the closed position, the case 404 is opposite the edge plate 408, and a technician can manipulate the bolt 406 to move it alternately from the locked position to the unlocked position.

The bolt 406 is manipulated by any known means. For example, by a pull-rod accessible from the outside of the hinged cover 200.

To ensure the correct alignment of the hinged cover 200 in the closed position, the nacelle 110 comprises an alignment system. The alignment system comprises several studs 450 fastened under the hinged cover 200 and, for each stud 450, a window 452 rigidly connected to the structure 402, where in the closed position, each stud 450 is positioned in a window 452. In the embodiment of the invention presented here, the window 452 is made in the edge plate 408. There are several studs 450 and windows 452 distributed around the hinged cover 200, for example at each corner.

To assist in the raising of the hinged cover 200 to the open position, the nacelle 110 comprises at least one cylinder 356, one end of which is mounted hinged on the structure 402 and the other end of which is mounted hinged on the hinged cover 200. The cylinder 356 assists the opening of the hinged cover 200 and ensures that it is held in the open position and is, for example, a gas cylinder.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbine engine assembly of an aircraft including a nacelle, the nacelle comprising:
    a structure comprising an attachment zone configured to be fastened to an attachment strut of the aircraft,
    an air intake defined by a first cover forming an air intake lip and fastened to the structure,
    a hinged cover arranged on an upper portion of the nacelle, at a rear of the first cover and between the first cover and the attachment zone,
    a hinge system ensuring a movement of the hinged cover alternately between a closed position in which the hinged cover is aerodynamically continuous with other covers and an open position in which the hinged cover clears an opening in the nacelle, and comprising on either side of a mid-plane of the nacelle, a front rod and a rear rod that are one in front of the other, where two ends of each rod are in a same plane parallel to the mid-plane, where a first end of each rod is mounted hinged on the hinged cover, where a second end of each rod is mounted hinged on the structure,
    a locking system configured to be actuated from an outside of the nacelle between a locked position in which the locking system locks the hinged cover onto the structure and an unlocked position in which the locking system does not lock the hinged cover onto the structure, and
    at least one cylinder, a first end of which is mounted hinged on the structure, and a second, opposite end of which is mounted hinged on the hinged cover, and that is arranged to assist the opening of the hinged cover and to ensure that the hinged cover is held in the open position.

2. The turbine engine assembly according to claim 1, wherein the locking system comprises several catches distributed around the hinged cover.

3. The turbine engine assembly according to claim 2, wherein each catch comprises a case fastened to the hinged cover and containing a bolt, and an edge plate fastened to the structure and containing a keeper, where the bolt is translatably mobile in the case between a locked position in which the bolt is locked in the keeper and an unlocked position in which the bolt is not locked in the keeper.

4. The turbine engine assembly according to claim 1, further comprising several studs fastened under the hinged cover and several windows rigidly connected to the structure, and, in the closed position, each stud is positioned in a respective one of the several windows.

5. An aircraft comprising an attachment strut and a turbine engine assembly according to claim 1, attached to the attachment strut in the attachment zone.

* * * * *